(12) United States Patent
Jukkola et al.

(10) Patent No.: US 11,409,017 B2
(45) Date of Patent: Aug. 9, 2022

(54) METAL DETECTOR COIL CONFIGURATION TO ELIMINATE ORIENTATION EFFECT

(71) Applicant: Eriez Manufacturing Co., Erie, PA (US)

(72) Inventors: James Jukkola, Erie, PA (US); Paul Smith, Erie, PA (US)

(73) Assignee: Eriez Manufacturing Co., Erie, PA (US)

( * ) Notice: Subject to any disclaimer, the term of this patent is extended or adjusted under 35 U.S.C. 154(b) by 0 days.

(21) Appl. No.: 17/254,791

(22) PCT Filed: Jun. 20, 2019

(86) PCT No.: PCT/US2019/038209
§ 371 (c)(1),
(2) Date: Dec. 21, 2020

(87) PCT Pub. No.: WO2019/246378
PCT Pub. Date: Dec. 26, 2019

(65) Prior Publication Data
US 2021/0263181 A1  Aug. 26, 2021

Related U.S. Application Data

(60) Provisional application No. 62/687,298, filed on Jun. 20, 2018.

(51) Int. Cl.
*G01V 3/10* (2006.01)

(52) U.S. Cl.
CPC .............. *G01V 3/107* (2013.01); *G01V 3/108* (2013.01)

(58) Field of Classification Search
CPC ......... G01V 3/107; G01V 3/108; G01V 3/104

USPC .......................................................... 324/329
See application file for complete search history.

(56) References Cited

U.S. PATENT DOCUMENTS

| | | | |
|---|---|---|---|
| 2,547,407 A | 4/1951 | Nelson | |
| 3,071,699 A * | 1/1963 | Eckl | G01V 3/107 361/185 |
| 3,361,962 A * | 1/1968 | Albrecht | G01V 3/107 324/243 |
| 3,526,886 A * | 9/1970 | Lubich | B61L 13/047 324/207.17 |
| 3,573,784 A * | 4/1971 | Bachofer | G01V 3/107 324/225 |
| 3,686,564 A | 8/1972 | Mallick, Jr. et al. | |
| 3,758,849 A | 9/1973 | Susman et al. | |

(Continued)

FOREIGN PATENT DOCUMENTS

| AU | 2017235923 A1 | 5/2016 |
|---|---|---|
| CN | 206270294 U | 6/2017 |

(Continued)

*Primary Examiner* — Christopher P McAndrew
(74) *Attorney, Agent, or Firm* — Jonathan M. D'Silva; MMI Intellectual Property

(57) ABSTRACT

A system for metal detection comprises a single aperture comprising two or more sets of detection coils that surround the perimeter of the aperture. A flow path of materials passes through the aperture. Each set of detection coils comprises a transmitter and two receiver coils, with the transmitter coil located between the two receiver coils. Each set of detection coils is at a different angle relative to the flow path.

9 Claims, 4 Drawing Sheets

(56) References Cited

U.S. PATENT DOCUMENTS

| | | | |
|---|---|---|---|
| 3,889,249 A * | 6/1975 | Bennett, Jr. | G01V 3/107 340/684 |
| 3,950,696 A | 4/1976 | Miller et al. | |
| 4,053,828 A * | 10/1977 | Ambler | G01V 3/108 336/122 |
| 4,779,048 A * | 10/1988 | Aichele | G01V 3/105 324/225 |
| 5,397,986 A * | 3/1995 | Conway | G01V 3/104 324/225 |
| 5,498,959 A | 3/1996 | Manneschi | |
| 5,726,628 A * | 3/1998 | Yoo | G01V 3/105 324/243 |
| 5,760,580 A * | 6/1998 | Tyren | G08B 13/2488 340/572.5 |
| 5,959,451 A | 9/1999 | De Torfino | |
| 6,420,866 B1 * | 7/2002 | Goldberg | G01V 3/105 209/567 |
| 6,488,668 B1 | 12/2002 | Prindle | |
| 7,576,534 B2 * | 8/2009 | Audet | C25C 3/125 324/241 |
| 7,663,361 B2 | 2/2010 | Nishio et al. | |
| 7,705,598 B2 | 4/2010 | Larsen | |
| 7,812,722 B2 | 10/2010 | Krantz | |
| 8,473,235 B2 | 6/2013 | Kittel et al. | |
| 8,841,903 B2 | 9/2014 | Lyon | |
| 9,018,935 B2 | 4/2015 | McAdam | |
| 2004/0155651 A1 * | 8/2004 | Britton | G01V 3/107 324/243 |
| 2008/0055080 A1 * | 3/2008 | Britton | G01V 3/107 340/551 |
| 2008/0297158 A1 | 12/2008 | Heger et al. | |
| 2011/0129063 A1 * | 6/2011 | Bendahan | G01V 5/0016 378/57 |
| 2011/0181276 A1 | 7/2011 | Moskalenko | |
| 2012/0179394 A1 * | 7/2012 | Kittel | G01V 3/104 702/57 |
| 2015/0234075 A1 * | 8/2015 | Moore | G01V 3/10 324/225 |
| 2017/0176388 A1 * | 6/2017 | Rigby | G01V 3/107 |
| 2017/0371061 A1 | 12/2017 | Zhao | |
| 2018/0003782 A1 | 1/2018 | Hassan et al. | |
| 2018/0368933 A1 * | 12/2018 | Henniges | B09B 3/0075 |

FOREIGN PATENT DOCUMENTS

| | | | | |
|---|---|---|---|---|
| EP | 0222028 A1 | | 11/1985 | |
| FR | 2516251 A1 | | 5/1983 | |
| GB | 2545710 A | * | 6/2017 | G01V 3/10 |
| JP | 2012083137 A | | 4/2012 | |
| JP | 2014153325 A | | 8/2014 | |
| JP | 2015164368 A | | 9/2015 | |
| JP | 2015186394 A | | 10/2015 | |
| JP | 2017045682 A | | 3/2017 | |
| WO | WO-2019215458 A1 | * | 11/2019 | |

\* cited by examiner

METAL DETECTOR COIL CONFIGURATION TO ELIMINATE ORIENTATION EFFECT

BACKGROUND

Metal detectors are used to detect metals and/or metal contaminants in product streams. Metal detectors detect metal as they pass through a plane of detection defined by the orientation of detection coils within the system. There are limitations in the ability of various metal detector systems to detect metals based on the orientation of the metal object as it passes through the plane of detection. What is needed is a solution that eliminates or reduces the orientation effect that prior art metal detectors are prone to.

SUMMARY

What is presented is a system for metal detection comprising a single aperture that further comprises two or more sets of detection coils that surround the perimeter of the aperture. A flow path of materials passes through the aperture. Each set of detection coils comprises a transmitter coil and two receiver coils, with the transmitter coil located between the two receiver coils. Each set of detection coils is at a different angle relative to the flow path. In some embodiments of metal detection systems, the aperture could comprise three sets of detection coils that surround the perimeter of the aperture.

In some embodiments, one set of detection coils is at an angle of 45 degrees relative to the flow path. In some embodiments, one set of detection coils is at an angle of 135 degrees relative to the flow path. In various embodiments, the flow path is one of a conveyor belt, a liquid line, or free-falling material. The aperture may be circular or a polygon. In various embodiments, the detection coils operate in the range of 1 kHz to 1 MHz. Each set of detection coils may be operated in a different detection frequency or in the same detection frequency.

Those skilled in the art will realize that this invention is capable of embodiments that are different from those shown and that details of the apparatus and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
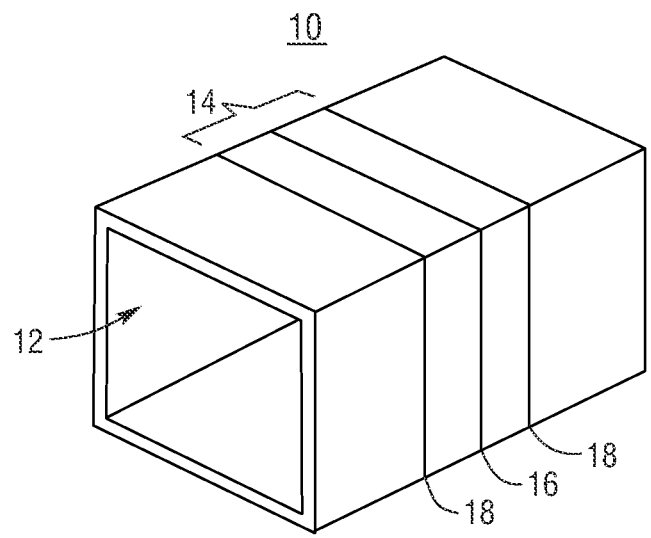
FIG. 1 shows a simplified schematic of a prior art metal detection system.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

FIG. 1 shows a simplified schematic of a prior art metal detection system 10. The system comprises an aperture 12 through which a flow path of materials passes through. A single set of detection coils 14 surrounds the perimeter of the aperture 12. The set of detection coils 14 comprise a transmitter coil 16 (also called an oscillator coil) and two receiver coils 18, with the transmitter coil 16 located between the two receiver coils 18.

Figure 2:
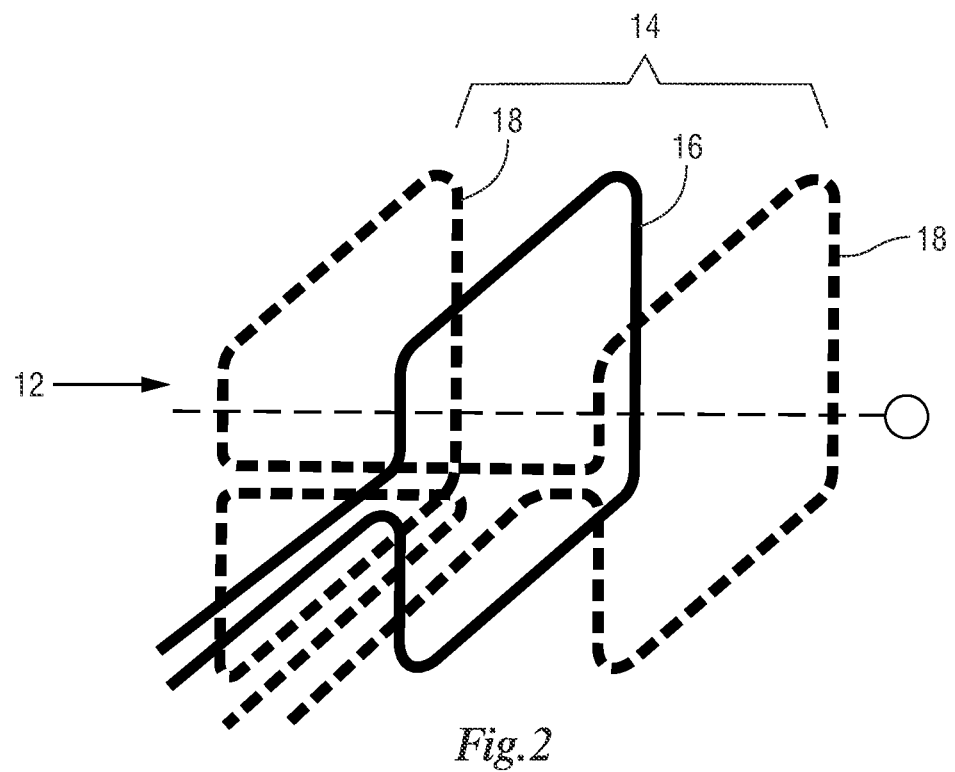
FIG. 2 shows a simplified schematic of the principle of operation of metal detection systems.

FIG. 2 illustrates the basic operating principle of the type of metal detector to which this disclosure applies. A single voltage is driven through the transmitter coil 16 by an oscillator (not shown). The two receiver coils 18 are located on a common axis with the transmitter coil 16 and are coupled into the electromagnetic field of the transmitter coil 18 in such a manner that the system is in balance and the induced voltages in the two receiver coils 16 cancel. Material to be screened that passes through the aperture 12 creates a distortion in the electromagnetic field if there is any metal passing along with the material in the flow path through the aperture 12. This distortion results in a difference in the induced voltages in the two secondary coils. The voltage difference is amplified, digitized, and filtered to extract detection information that is used to decide whether the signal represents metal or the user's product. If the signal represents the user's product, it is ignored. If it represents metal that exceeds a pre-set sensitivity level, the detector generates a detection signal that initiates reject and/or alarm actions.

Figure 3:
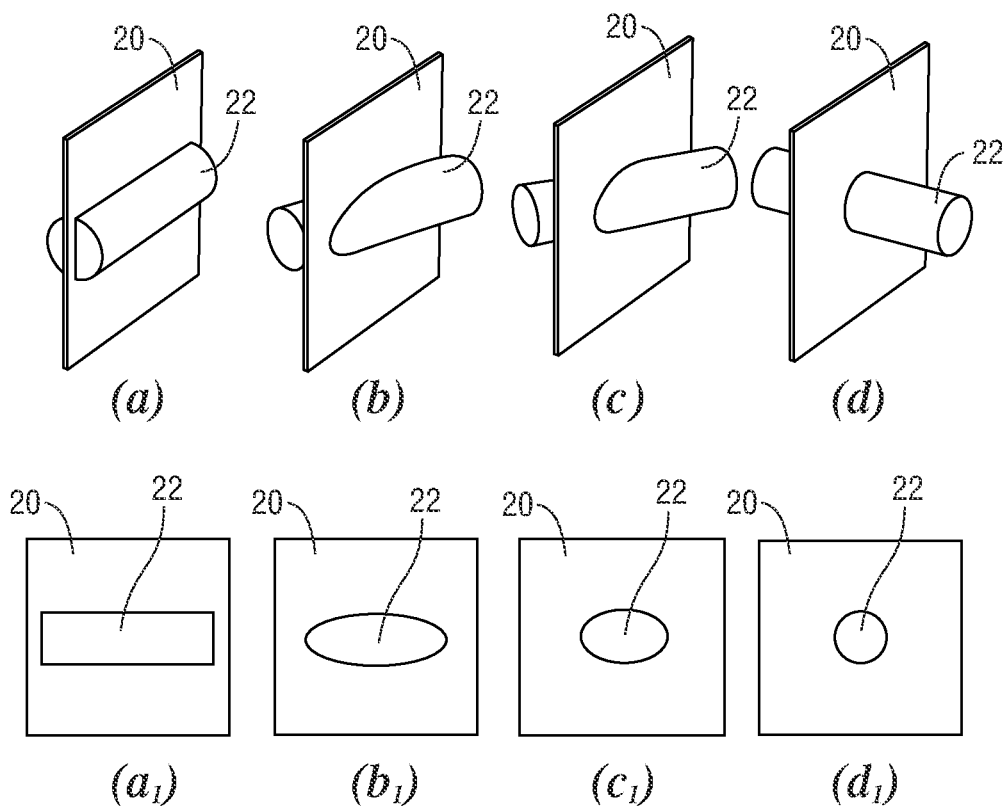
FIG. 3 depicts a metal contaminant passing through a detection plane in various configurations.

Referring to FIG. 3, for long thin metal contaminants 22 (referred to herein as a "wire," but could be a needle, staple, metal shaving, etc.), metal detectors typically have more difficulty detecting the contaminant in one orientation than in other orientations. For example, if a wire 22 passes through the metal detector with its long dimension parallel to the detection plane 20 of the detector coil, it may produce a significantly larger signal than if the same wire 22 passed through in an orientation perpendicular to the detection plane 20 of the detector coil. This is referred to as the "orientation effect," and it occurs because the detection signal is related to the area of eddy current loops which are developed in the wire 22. In FIG. 3 (a)-(d) shows a cylindrical contaminant wire 22 passing through the detection plane 20 at several angles, and FIG. 3 ($a_1$)-($d_1$) shows the corresponding cross-sectional areas of the wire 22 intersecting the detection plane 20.

If a metal contaminant 22 type develops eddy current loops parallel to the detection plane 20 of the detector coils, they produce their largest signal in orientation shown in FIG.

3(a), because that gives the largest area for the eddy current loops as shown in FIG. 3($a_1$). The contaminant 22 orientation shown in FIG. 3 (d) has the smallest cross-sectional area shown in FIG. 3($d_1$), thus producing the smallest signal.

Some metal contaminant 22 types are the opposite, developing their signal based on cross-sectional area perpendicular to the detection plane 20. For these metal types, FIG. 3 (d) is the best case for detection sensitivity.

Metal detector sensitivity is usually specified based on detecting a metal sphere, which has no orientation effect. For a sphere, the cross-sectional area parallel to the plane is equal to the area perpendicular to the plane, and the cross-section is always the same regardless of rotation of the sphere. The smallest sphere (of a given metal type) which is detectable by a given metal detector is called the "rated metal sphere" for that detector and metal type.

A wire can arrive at the detector in any random orientation, so assuming the worst case, and the sensitivity for wires must be specified based on the diameter of the wire, regardless of length. Wires with a diameter greater than or equal to the rated metal sphere diameter will typically be detectable even in the worst orientation. A smaller-diameter wire, even if relatively large compared to the rated metal sphere size, has a risk of passing through without being detected.

Figure 4:
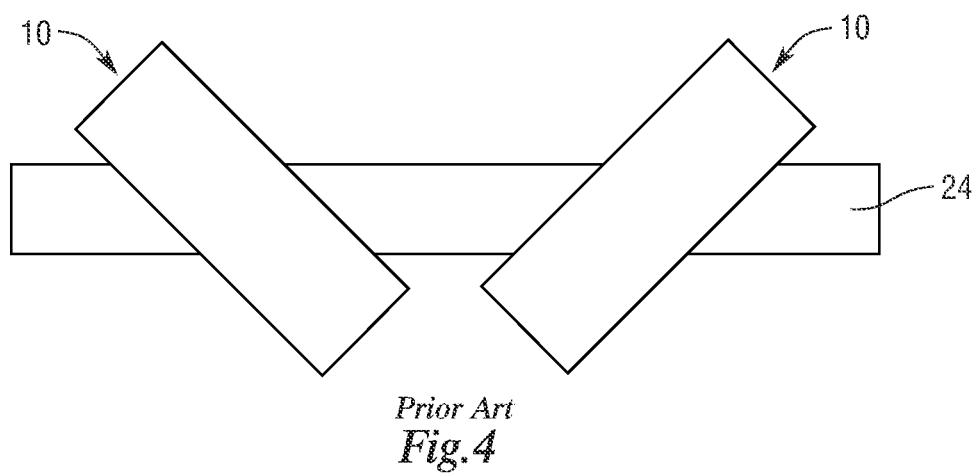
FIG. 4 depicts a simplified schematic of a prior art metal detection system comprising two separate metal detection systems with two apertures at different angles to the material flow path.

Most metal detector installations simply accept (or ignore) this risk. Where orientation effect was considered an unacceptable risk, FIG. 4 shows an example of a prior art metal detector 10 installations using two separate metal detectors 10, installed on the same conveyor line 24 on which a will material stream pass through. The metal detectors 10 are oriented at different angles relative to the conveyor line 24. This has several disadvantages: it requires two complete metal detectors 10; it requires a longer conveyor line 24 system; in order to be able to be placed at an angle, the metal detectors 10 must be much wider than the conveyor line 24; it assumes that the wire does not change orientation while traveling between the two metal detectors 10; and with two metal detectors 10 it still does not completely eliminate orientation effect for metal types which have a worst case parallel to the coil, as explained later.

Figure 5:
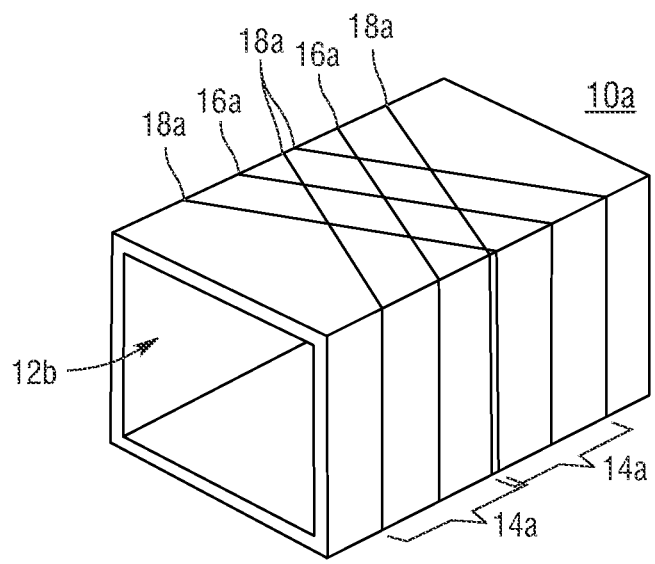
FIG. 5 is a simplified schematic of an embodiment of the metal detection system having two sets of detection coils.

FIG. 5 shows a simplified schematic of metal detector 10a disclosed herein that addresses some of the limitations of the prior art systems. The system comprises an aperture 12a through which a flow path of materials passes through. Two sets of detection coils 14a surrounds the perimeter of the aperture 12a. Each set of detection coils 14a comprises a transmitter coil 16a and two receiver coils 18a, with the transmitter coil 16a located between the two receiver coils 18a. In this embodiment the detector coils 14a are crossed on the top and bottom of the aperture 12a. The aperture 12a is shown as a having a rectangular opening in the figures, but it could be any shape required by the application such as any other polygon or a circle. The flow path of material that passes through the aperture 12a may be a conveyor belt, a liquid line, or free-falling material.

The system presented herein comprises two sets of metal detection coils 14a within one metal detector 10a housing. Each set of detection coils 14a comprises a transmitter coil 16a and two receiver coils 18a, all parallel to each other. However, each set of detection coils 14a is at a different angle relative to the direction of material travel through the aperture 12a. The detection coils 14a operate in a detection frequency in the range of 1 kHz to 1 MHz. The separate sets of detection coils 14a are operated preferably at different detection frequencies, but it is possible they could be operated at the same detection frequency.

In some embodiments of powering the transmitter coils 16a, the separate transmitter coils 16a interfere with each other if there is mutual inductance coupling each transmitter coil 16a, so the transmitter coils 16a must be separated by a great enough angle to reduce this mutual inductance to an acceptable level. A 90° angle between each detection coil 14a system reduces the mutual inductance to the minimum possible. Other angles are possible to reduce interference from each other, but a large angle (ideally 90°) is still desirable, for the maximum reduction of orientation effect. Embodiments where one set of detection coils is at an angle of 45° relative to the flow path have found to be effective. Embodiments where one set of detection coils is at an angle of 135° relative to the flow path have also found to be effective. However, using a large angle has a disadvantage of requiring a larger metal detector (i.e., a longer tunnel in the direction of product travel).

Figure 6:
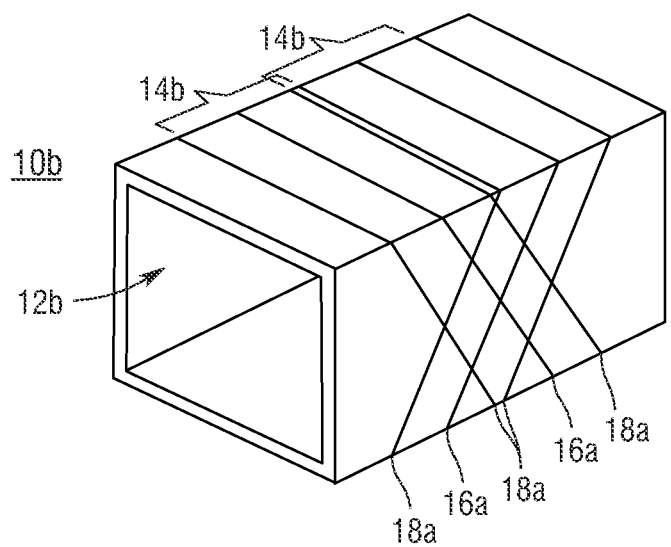
FIG. 6 is a simplified schematic of another embodiment of the metal detection system having two sets of detection coils.

FIG. 6 shows another embodiment of the metal detection system 10b having two sets of detection coils 14b in which the detector coils 14b are crossed on the sides of the aperture.

Figure 7:
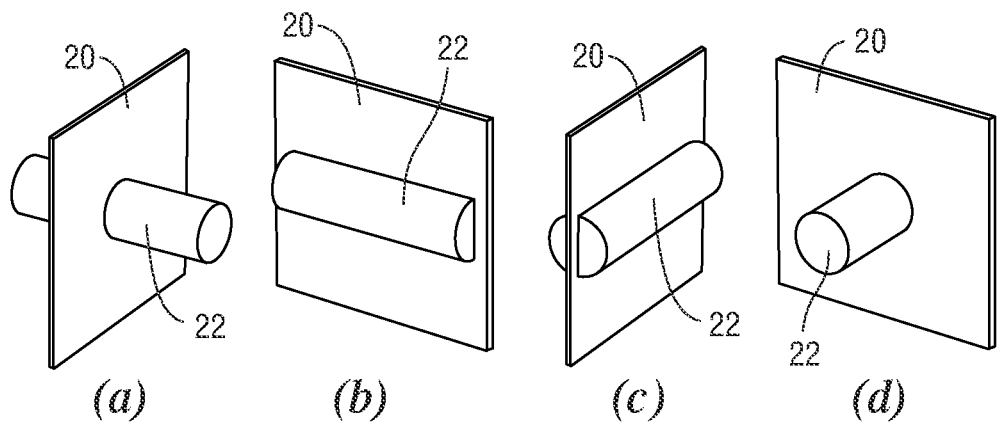
FIG. 7 depicts a metal contaminant passing through a detection plane in various configurations.

As illustrated in FIG. 7, in the systems presented, metal contaminants 22 are simultaneously subjected to detection planes 20 from more than one angle. So, if the contaminant 22 is in the worst orientation for detection at one detection plane 20, it can be in a more favorable orientation for the other detection plane 20. For metal types which have the worst-case detection perpendicular to the detection plane 20, two sets of detection planes 20 are enough. The two sets of detections coils form intersecting detection planes 20 as shown in FIGS. 7 (a)-(b) and (c)-(d). A wire contaminant 22 in any orientation cannot be perpendicular to both detection planes 20.

Figure 8:
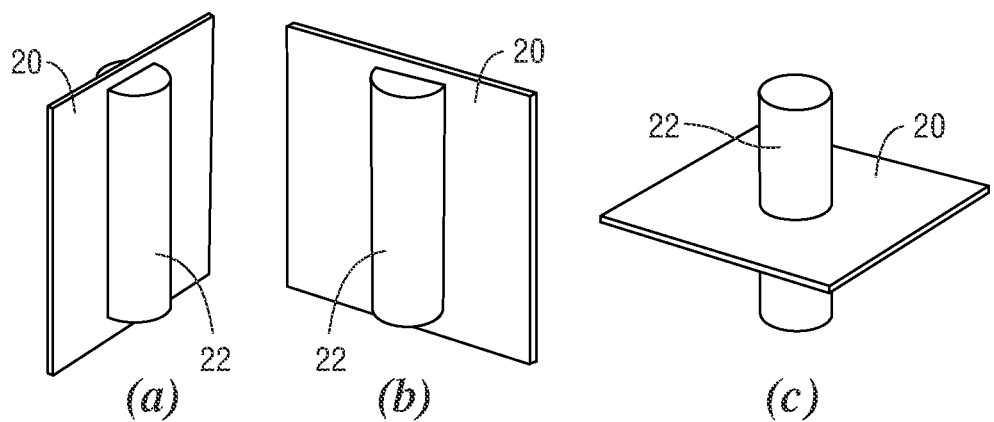
FIG. 8 depicts a metal contaminant passing through a detection plane in various configurations.

Metal contaminant 22 types which have the worst-case detection parallel to the detection plane 20 will require three sets of detection planes 20 to eliminate the orientation effect. Two sets detection planes 20 having orientations as shown in FIG. 7 would greatly reduce the problem. However, FIG. 8 (a)-(b) shows there would still be one orientation at which a contaminant wire 22 could be parallel to two detection planes 20, so a third detection plane 20 as shown in FIG. 8 (c) is needed.

Figure 9:
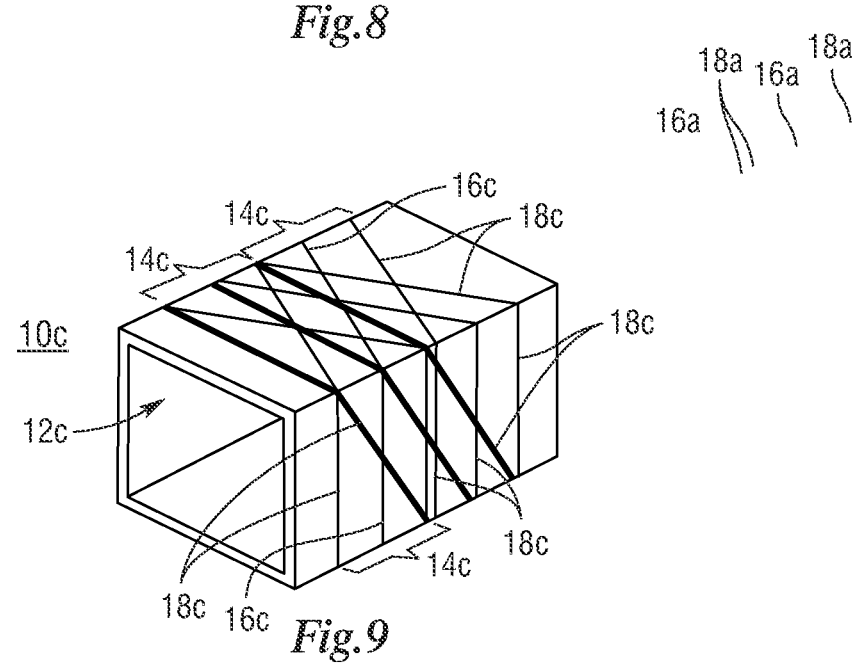
FIG. 9 is a simplified schematic of another embodiment of the metal detection system having three sets of detection coils.

FIG. 9 shows an embodiment of the metal detection system 10c having three sets of detection coils 14c for three different intersecting angles of detection planes. Embodiments with four sets of detection coils are possible but would have limited utility for eliminating orientation effects since all orientations are able to be handled by three sets of detection coils.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:
1. A system for metal detection comprising:
a single aperture comprising two or more sets of detection coils that surround the perimeter of said aperture wherein each said detection coil defines a detection plane within the aperture;
a flow path of materials that passes through said aperture;
each said set of detection coils comprises a transmitter coil and two receiver coils, with said transmitter coil located between said two receiver coils; and each set of said detection coils is at a different angle relative to said flow path such that said flow path is subjected to each of said detection planes simultaneously.

2. The system for metal detection of claim 1 wherein one set of detection coils is at an angle of 45 degrees relative to said flow path.

3. The system for metal detection of claim 1 wherein one set of detection coils is at an angle of 135 degrees relative to said flow path.

4. The system for metal detection of claim 1 further comprising said flow path is one of a conveyor belt, a liquid line, or free-falling material.

5. The system for metal detection of claim 1 wherein said aperture is circular or a polygon.

6. The system for metal detection of claim 1 wherein said aperture comprises three sets of said detection coils that surround the perimeter of said aperture.

7. The system for metal detection of claim 1 wherein said detection coils operate in the range of 1 kHz to 1 MHz.

8. The system for metal detection of claim 1 wherein each said set of detection coils operates in a different detection frequency.

9. The system for metal detection of claim 1 wherein each said set of detection coils operates in the same detection frequency.

* * * * *